US006416309B1

(12) United States Patent
Michlitsch et al.

(10) Patent No.: US 6,416,309 B1
(45) Date of Patent: Jul. 9, 2002

(54) APPARATUS FOR A REUSABLE, HEATED ICE CREAM SCOOP CONTAINING SUPERCOOLABLE SALT SOLUTION

(76) Inventors: Kenneth J. Michlitsch, 722 Colorado Ave., Palo Alto, CA (US) 94303; Shaun Meredith, 22 Washington Ave., Natick, MA (US) 01760; Daniel J. Keating, 23 Michigan Ave., Somerville, MA (US) 02145; Yaakov Weinstein, 116 Winthrop Rd., Apt. 3, Brookline, MA (US) 02445; Eugene Lee, 42 Spencer Ave., Somerville, MA (US) 02144; Michael D. Rees, 85 Chambers St., Apt. 3R, New York, NY (US) 10007; Darren Soetantyo, 76 Blackstone Blvd., Apt. 6, Providence, RI (US) 02906; Sean Padgett, 57 Old Upton Rd., Grafton, MA (US) 01519; Steven D. Eppinger, 5 Ryder La., Lexington, MA (US) 02421

( * ) Notice: Subject to any disclaimer, the term of this patent is extended or adjusted under 35 U.S.C. 154(b) by 0 days.

(21) Appl. No.: 09/505,444

(22) Filed: Feb. 16, 2000

Related U.S. Application Data

(60) Provisional application No. 60/120,630, filed on Feb. 18, 1999.

(51) Int. Cl.[7] ............................................. A23G 09/28
(52) U.S. Cl. ...................................... 425/187; 425/279
(58) Field of Search ................................. 425/187, 276, 425/277, 279

(56) References Cited

U.S. PATENT DOCUMENTS

| | | | | |
|---|---|---|---|---|
| 2,560,900 A | * | 7/1951 | Shultz | 425/277 |
| 3,358,619 A | * | 12/1967 | Pareira | 425/276 |
| 3,809,520 A | | 5/1974 | Wilk et al. | 425/276 |
| 3,992,604 A | | 11/1976 | Leddy | 219/227 |
| 4,077,390 A | | 3/1978 | Stanley et al. | 126/263 |
| 4,386,900 A | | 6/1983 | Sultan | 425/279 |
| 4,451,383 A | * | 5/1984 | Arrhenius | 252/70 |
| 4,553,921 A | | 11/1985 | Lamphere et al. | 425/279 |
| 4,872,442 A | | 10/1989 | Manker | 126/263 |
| 5,000,672 A | | 3/1991 | Halimi | 425/279 |
| 5,131,832 A | | 7/1992 | Budreau | 425/277 |
| 5,736,110 A | | 4/1998 | Angelillo et al. | 422/245.1 |
| 5,837,296 A | | 11/1998 | Virkler | 425/277 |

FOREIGN PATENT DOCUMENTS

FR                2744596 A1    * 8/1997

* cited by examiner

*Primary Examiner*—Robert Davis
*Assistant Examiner*—Donald Heckenberg

(57) ABSTRACT

Methods and apparatus are provided for serving ice cream with a chemically-heated ice cream scoop. The scoop comprises a bowl and a handle with an interior cavity filled with a nontoxic, supercoolable salt solution. The salt solution may be selectively crystallized by triggering an activator in fluid communication with the solution. Crystallization evolves a significant amount of heat that is used to elevate the temperature of the scoop bowl, thereby decreasing the cutting force required to separate a serving of ice cream from a storage container and reducing adherence of the ice cream within the scoop bowl. After use, the scoop may be recharged by elevating the temperature of the crystallized solution above its crystallization temperature. The process of crystallization, melting, and supercooling may be repeated indefinitely.

21 Claims, 4 Drawing Sheets

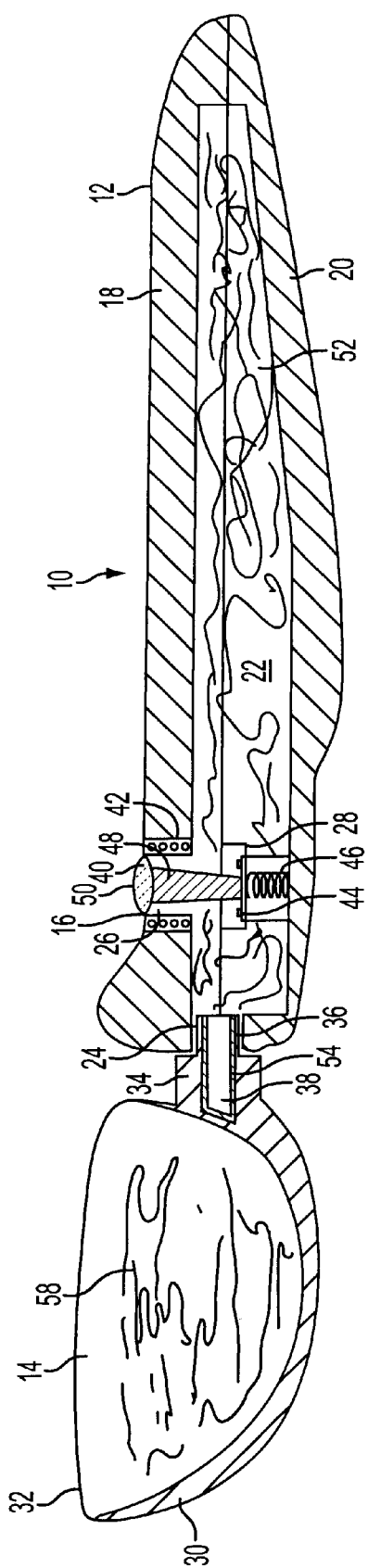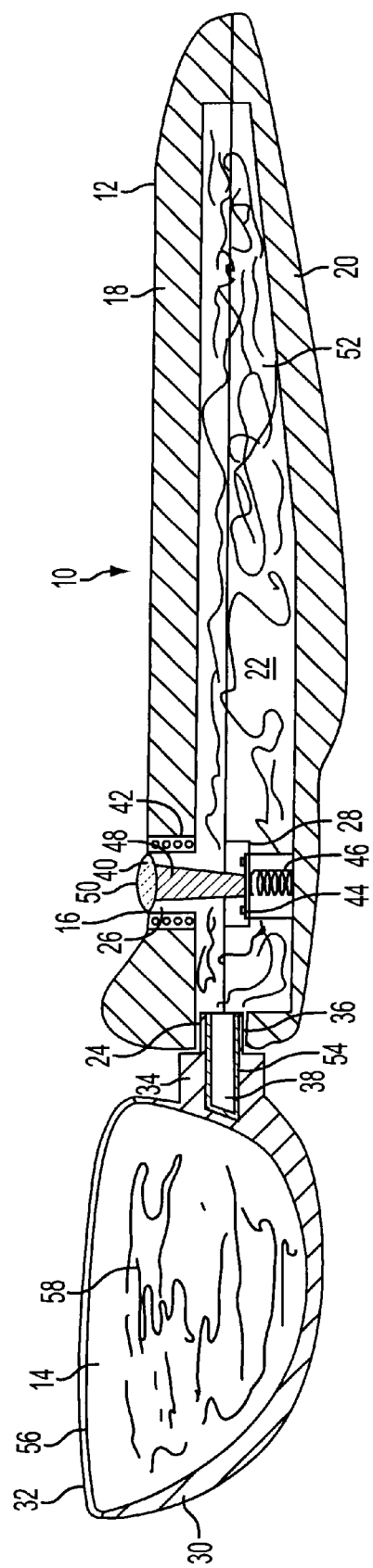

APPARATUS FOR A REUSABLE, HEATED ICE CREAM SCOOP CONTAINING SUPERCOOLABLE SALT SOLUTION

REFERENCE TO RELATED APPLICATION

The present application claims the benefit of the filing date of provisional U.S. patent application Ser. No. 60/120,630 filed Feb. 18, 1999, and takes advantage of that filing date.

FIELD OF THE INVENTION

The present invention relates to apparatus and methods for serving a frozen product. More particularly, the present invention relates to a reusable heated ice cream scoop containing a supercoolable salt solution.

BACKGROUND OF THE INVENTION

Using scoops, spades, and spoons, ice cream is commonly transferred from a storage container to a serving dish or cone. If the ice cream is hard packed, removing a serving of ice cream from the storage container may require application of a significant cutting force. This force may be too great for some individuals to apply, especially when applied repetitively, as is required, for example, of ice cream parlor employees. Furthermore, the ice cream often adheres to the scoop after separation from the storage container, making it difficult to transfer the ice cream to the serving dish or cone.

To reduce the required cutting force, scoops often are warmed prior to use, for example, by being placed in a container of heated water. In use, the scoop then conducts thermal energy to the ice cream with which it comes in contact, thereby softening or slightly melting the ice cream. The force needed to cut through and remove the serving of softened ice cream is thus significantly reduced. Additionally, the ice cream is less likely to adhere to the scoop and is easier to transfer to a serving dish or cone.

Though the foregoing method may be effective, heated water containers often are used to warm several scoops simultaneously, thereby creating unsanitary and aesthetically unattractive conditions. In addition, this previously known method presents a risk of contamination when a scoop transfers unsanitary water to the ice cream within the storage container. Furthermore, the scoop must frequently be returned to the water bath to maintain an elevated temperature, prolonging the time and effort required to prepare an ice cream serving.

Numerous previously known methods and apparatuses have been proposed for serving ice cream that seek to obtain the benefits derived from elevating scoop temperature, without suffering the frequent heating delays and risk of contamination associated with heated water baths. For example, U.S. Pat. No. 5,837,296 to Virkler describes a hollow scoop with a removable cap that facilitates filling the scoop with warm tap water before use. The device described in that patent may be effective for short-term use; however, the apparatus is expected to be able to sustain an elevated temperature for only relatively short periods of time before the warm water inside the scoop cools, thus requiring repetitive replacement of the water.

Several commercially available products seal a quantity of water or antifreeze within a hollow handled scoop, so that the sealed liquid acts as a heat sink. While the heat sink is supposed to decrease the rate at which the cutting surface of such a scoop drops from room temperature towards the temperature of the ice cream, applicants' tests of such devices have shown these heat sinks provide little additional benefit to the user, as compared to traditional, solid-handle scoops. Typically, the storage container from which the serving of ice cream is removed provides a much larger heat sink than the sealed liquid within the scoop handle, and, consequently, the cutting surfaces of such previously known devices rapidly approach the ice cream temperature. Moreover, even if such devices reduced the cooling rate at the cutting surface, they provide no benefit in decreasing the initial cutting force required.

U.S. Pat. No. 3,809,520 to Wilk describes an ice cream scoop with an interior fluid circulation passage that may be connected to a faucet. Warm water is continuously circulated through the interior of the scoop so that the scoop's cutting surface remains heated. While Wilk may be effective, the device has a limited range since it must remain connected to a warm water source. It is also thermally and ecologically inefficient because the warm water is disposed after it has passed through the interior passage once.

Electrical resistive heating has also been proposed as a means of elevating scoop temperature. For example, U.S. Pat. No. 3,992,604 to Leddy, U.S. Pat. No. 4,386,900 to Sultan, and U.S. Pat. No. 4,553,921 to Lamphere all describe scoops with heating elements that are connected by power cords to electrical outlets. While electrical outlets are able to deliver ample energy for resistive heating, the utility of such scoops is limited by the length of the attached power cords. Furthermore, such designs pose an inherent risk of electrocution, especially in the fluid environments provided by melted ice cream and during cleaning.

U.S. Pat. No. 5,000,672 to Halimi attempts to overcome some of the drawbacks of AC voltage heated scoops by using batteries as the source of electrical power. A resistive wire is attached along the cutting edge of the scoop. The scoop is actively heated only along the wire, thereby minimizing the heated volume and reducing the power drain on the batteries. Applicants' thermodynamic modeling of the Halimi device, however, reveals that the remainder of the scoop bowl acts as a heat sink which actually conducts heat away from the cutting surface. Thus, for example, if the scoop bowl is metal, maintaining an adequate elevated temperature at the cutting surface for any significant length of time is expected to require more energy than is typically available from standard batteries. Alternatively, use of a plastic scoop bowl may result in melting of the plastic or thermal and mechanical fatigue problems.

Other heating methods also have been proposed. For example, U.S. Pat. No. 5,131,832 to Budreau uses a butane heating cartridge or a standard lighter as the energy source. Since the fuel must be ignited, a risk of fire or skin burns exists, as well as melting of the ice cream due to overheating. In short, several methods for heating an ice cream scoop have been proposed, but all of these methods suffer from shortcomings that have limited or prevented widespread adoption in the marketplace.

In view of the foregoing, it would be desirable to provide methods and apparatus for serving frozen products that overcome the disadvantages of previously known devices.

It further would be desirable to provide methods and apparatus for serving frozen products that elevate the temperature of the apparatus with a reusable, temperature controllable, safe, sanitary, inexpensive, effective, ecologically-conscious, and reliable heat source.

It still further would be desirable to provide methods and apparatus for serving frozen products that meet the requirements of both the home and the commercial markets.

SUMMARY OF THE INVENTION

In view of the foregoing, it is an object of the present invention to provide methods and apparatus for serving frozen products that overcome the disadvantages of previously known devices.

It is another object of the present invention to provide methods and apparatus for serving frozen products that elevate the temperature of the apparatus with a reusable, temperature controllable, safe, sanitary, inexpensive, effective, ecologically-conscious and reliable heat source.

It is yet another object of the present invention to provide methods and apparatus for serving frozen products that meet the requirements of both the home and commercial markets.

These and other objects of the present invention are accomplished by providing an ice cream scoop or spade heated by an internal reservoir of aqueous, supercoolable salt solution. Activation of the solution produces a highly exothermic reaction, which causes the solution to crystallize and release a significant amount of stored energy as heat. The crystalline salt may be returned to solution by simply raising its temperature above the temperature evolved by activation of the exothermic reaction, generally in a range of about 110–130 degrees Fahrenheit.

In a preferred embodiment of the present invention, the salt is food grade sodium acetate, which is completely nontoxic. The aqueous, supersaturated sodium acetate solution is introduced along with an activation mechanism into an interior cavity within a scoop handle. Preferably, the cavity also extends within the interior of the scoop head. The handle and head are joined in a manner that allows the activation mechanism to be triggered from the exterior of the scoop. The sealed assembly and its contents are thereafter heated to a temperature in excess of the melting point of sodium acetate to completely liquefy it. The device then is supercooled to room temperature.

Before serving a frozen product, the exothermic reaction is initiated by triggering the activation mechanism. The sodium acetate crystallizes, and heat is evolved. The heated scoop decreases the cutting force needed to serve ice cream and also reduces adherence of the ice cream to the scoop. Upon completion of use, the scoop is recharged by simply remelting the salt solution and supercooling the scoop and its contents.

In an alternative embodiment, the scoop may be attached and detached to a heat cartridge containing a supersaturated salt solution. In commercial applications, for example, where ice cream is served over the course of an entire business day, it is impractical to recharge the preferred embodiment described above multiple times throughout the day. Thus, a single scoop may be used in conjunction with multiple heat cartridges that are alternated between use and recharging throughout the day.

The heated scoop of the present invention provides several benefits, including simple construction and operation. Also, because the activation mechanism is both sealed and self-contained, recharging may be achieved in a normal dishwasher cycle or in a heated water bath. An appropriate ratio of solute to solvent ensures that the temperature attained in a normal dishwasher cleaning cycle is sufficient to melt the crystalline salt back into solution and that the solution is relatively stable at room temperature, e.g., shaking does not result in crystallization and heat generation. Furthermore, the maximum temperature to which the scoop head is heated facilitates cutting through hard packed ice cream without excessive ice cream melting.

The scoop handle is designed to insulate the user from heat generated during crystallization and to facilitate efficient thermal transfer to the scoop bowl and the ice cream. Additionally, unlike battery-powered, electrically heated scoops, the heat source and its activator may be reused numerous times without replacement. Thus, the heated scoop of the present invention is as ecologically benign as a standard scoop. In addition, food grade sodium acetate is very safe, inexpensive to manufacture, and provides an effective and reliable heat source. Methods of using the apparatus of the present invention also are provided.

BRIEF DESCRIPTION OF THE DRAWINGS

Further features of the invention, its nature and various advantages will be more apparent from the accompanying drawings and the following detailed description of the preferred embodiments, in which:

FIG. 3 is a side-sectional view of the apparatus of FIG. 1;

FIG. 4 is a side-sectional view of an alternative embodiment of apparatus constructed in accordance with the present invention with a resistive wire for heating the cutting surface.

DETAILED DESCRIPTION OF THE INVENTION

The present invention provides apparatus for serving ice cream and other frozen foods that are typically stored in bulk storage containers. The apparatus comprises a chemically-heated scoop that decreases the cutting force required to serve a frozen food and that reduces adherence of the frozen food within the apparatus. In the context of the present invention, the term "ice cream" refers to any frozen product routinely packaged in bulk from which individual servings are removed with some form of a scoop or spade. Such frozen products include, but are not limited to, ice cream, sorbet, frozen yogurt, and sherbet. As used herein, the term "scoop" refers to any utensil used to serve the product, including, for example, an ice cream scoop, a spade, or a spoon.

Figure 1A:
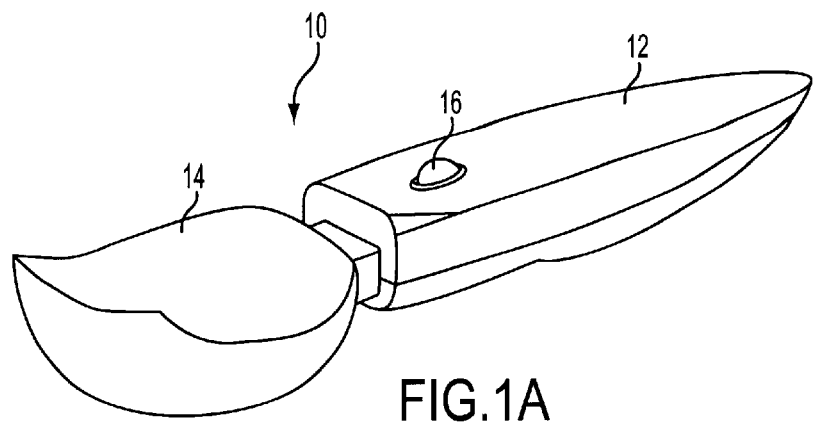
FIGS. 1A–1C are isometric views of apparatus and components constructed in accordance with the present invention.
Figure 1C:
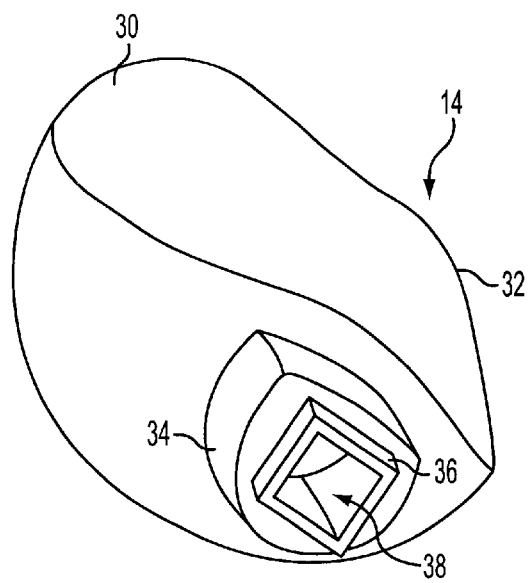
Figure 1B:
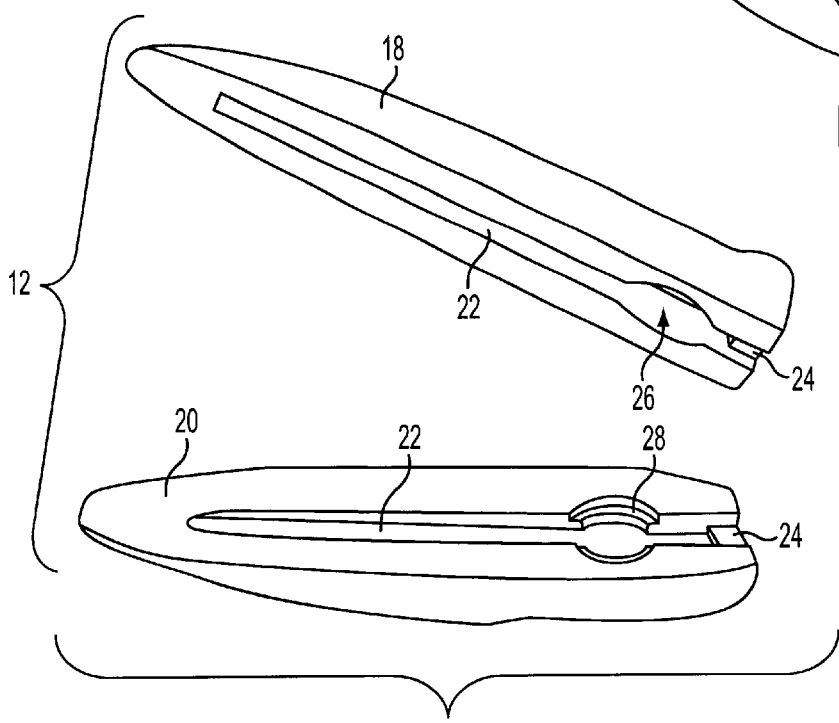

Referring now to FIGS. 1A–1C, an illustrative embodiment of a heated ice cream scoop of the present invention is described. Scoop 10 comprises handle 12, bowl 14, and activation mechanism 16. Handle 12 comprises upper section 18 and lower section 20, which when joined form interior cavity 22 and axial bore 24. Upper section 18 further includes radial bore 26, while lower section 20 includes ledge 28. FIG. 1B shows handle 12 in greater detail.

Bowl 14 comprises head 30 with cutting edge 32, and stem 34 with neck 36 and stem bore 38. Axial bore 24 of handle 12 is configured to sealingly receive neck 36 of bowl 14. FIG. 1C shows bowl 14 in greater detail.

Figure 2:
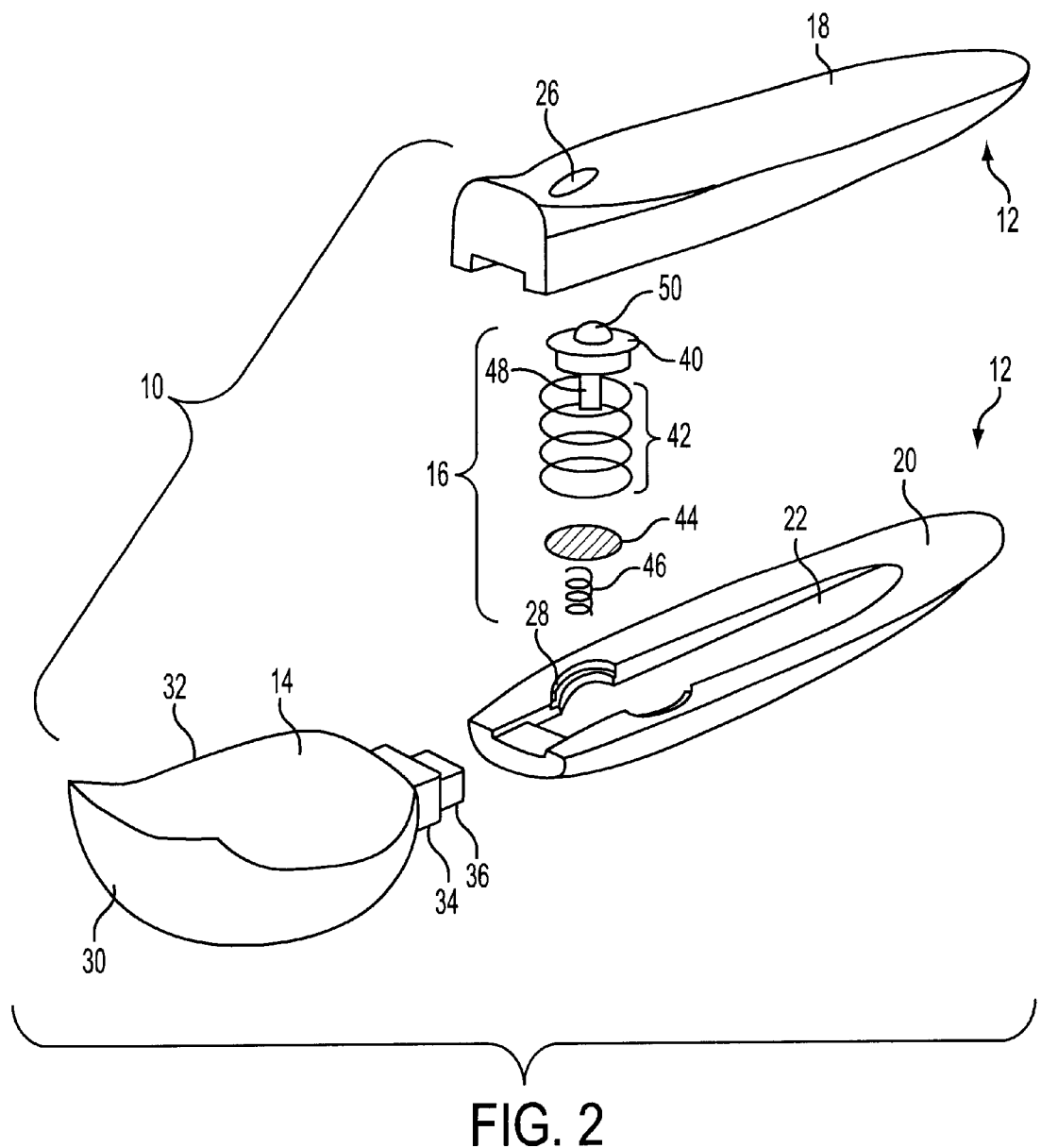
FIG. 2 is an exploded assembly drawing of the apparatus of FIG. 1.

Referring now also to FIGS. 2 and 3, activation mechanism 16 comprises activator button 40, sealing rings 42, and activator 44. Sealing rings 42 may, for example, comprise 0-rings. Mechanism 16 optionally also may include tensile spring 46. Activator button 40 includes elongated member 48 and proximal knob 50. Radial bore 26 is configured to sealingly receive activator button 40 and sealing rings 42.

Interior cavity 22 of handle 12 is sealed when scoop 10 is fully assembled. In accordance with the principles of the present invention, cavity 22 is filled with nontoxic, aqueous supercoolable salt solution 52. Rechargeable, supercoolable salt solutions are known for use in heat packs for medical and muscle soreness applications. In a preferred embodiment, the solution comprises sodium acetate. Solution 52 fills cavity 22, as well as stem bore 38 of bowl 14. Activator 44 is in fluid communication with solution 52, and its perimeter sits on ledge 28 of lower section 20 of handle 12. The distal end of elongated member 48 contacts the central portion of activator 44.

Activator 44 may be any of a variety of apparatus, per se known, for activating crystallization of a supercooled salt solution. Although the precise mechanism for activation of the exothermic reaction is unclear, several previously known methods and apparatus have been developed to reliably and controllably initiate the reaction. Examples include U.S. Pat. No. 4,077,390 to Stanley et al., U.S. Pat. No. 4,872,442 to Manker, and U.S. Pat. No. 5,736,110 to Angelillo et al. Angelillo et al. provides a thorough review of such apparatus, and is therefore incorporated herein by reference. Activator 44 illustratively is of the disk variety disclosed, for example, in the Angelillo patent or in U.S. Pat. No. 4,872,442 to Manker.

Application of force to proximal knob 50 of activator button 40 causes distal advancement of elongated member 48. Distal advancement of elongated member 48, in turn, causes distal advancement of the central portion of activator 44 with respect to its perimeter. Upon release of the force applied to button 40, the elongated member resiliently returns to its initial position. If activator 44 is bifurcated, it also resiliently returns to its initial position. If activator 44 is not bifurcated, tensile spring 46 may be used to return the activator to its initial position.

Flexing activator 44 in this manner initiates crystallization of supercoolable salt solution 52 when it is in the supercooled state, with concomitant evolution of heat in a highly exothermic reaction. The salt may be returned to solution by melting the crystallized salt at a temperature in excess of the crystallization temperature. Solution 52 may then be supercooled once again and activator 44 may again trigger the crystallization reaction, thus providing a fully reversible thermal cycle. Activator 44 is fabricated from a material that is capable of initiating crystallization, for example, stainless steel.

Handle 12, activator button 40, sealing rings 42, and tensile spring 46 preferably are fabricated from materials compatible with solution 52. A material is deemed compatible if it is generally incapable of initiating crystallization of solution 52 and is impermeable to the solution. In addition, the material must be able to withstand temperatures in excess of the crystallization temperature of solution 52 so that the crystalline salt may be melted back into solution. The crystallization temperature may be precisely set by selecting an appropriate ratio of solute to solvent in solution 52, and is generally in the range of 110-130 degrees Fahrenheit when using sodium acetate as the solute and water as the solvent. The fabrication material also preferably is a poor conductor of heat. Suitable materials include several polymers, for example, polyethylene or vinyl. Handle 12 may further comprise a material that is transparent or translucent to allow the user to see whether or not solution 52 has crystallized. It may also comprise a layer of insulating material, such as fiberglass, to further retard heat conduction.

Conversely, scoop bowl 14 preferably is fabricated from a material that is a very good conductor of heat. Suitable materials include several metals, for example, aluminum and stainless steel. As depicted in FIG. 3, stem bore 38 of bowl 14 optionally may be coated with coat 54 comprising a thin layer of material that is compatible with solution 52. Coat 54 is the only part of bowl 14 in fluid communication with solution 52 and may, for example, be fabricated from an epoxy resin.

Referring still to FIGS. 1 and 3, a method of using the apparatus of the present invention is described. Scoop 10, containing supercoolable salt solution 52 in the supercooled state, is held by the user while knob 50 is depressed, thereby distally advancing elongated member 48 and flexing activator 44. Flexing of activator 44 initiates crystallization of solution 52, which, in turn, liberates a significant amount of heat. This thermal energy is conductively transferred from solution 52 to scoop bowl 14, thereby elevating the temperature of the scoop bowl. An adequate elevated temperature is maintained long enough to serve several servings of ice cream. Cutting edge 32 of bowl 14 contacts ice cream in a storage container and softens or slightly melts the ice cream with which it comes in contact, thus reducing the force required to cut through the ice cream. The ice cream then is transferred to a serving container, such as a dish or cone. Due to the elevated temperature of scoop 10, adherence of ice cream within bowl 14 is also greatly reduced.

Once the ice cream has been served, scoop 10, and specifically solution 52, are heated to a temperature above the crystallization temperature of solution 52 to completely melt the crystalline solution. Again, the crystallization temperature may be empirically chosen such that it heats bowl 14 to an adequate temperature for serving ice cream without excessive melting of the ice cream. A crystallization temperature of approximately 120 degrees Fahrenheit is preferable.

Advantageously, most standard dishwashers clean with water in excess of 120 degrees Fahrenheit. Thus, solution 52 may be melted from the crystalline state simply by cleaning scoop 10 in a dishwasher. However, since some dishwashers may not achieve an adequate cleaning temperature for an adequate length of time to fully melt solution 52, scoop 10 alternatively may be recharged by placement in a water bath heated to a temperature in excess of the crystallization temperature of solution 52. After the solution has been completely melted, it is supercooled, and scoop 10 may again be used to serve ice cream. The steps of crystallization, melting, and supercooling may be repeated indefinitely.

Referring now to FIG. 4, an alternative embodiment of the apparatus of the present invention is described, in which like components to the embodiment of FIGS. 1–3 are indicated by like reference numerals. In the embodiment of FIG. 4, bowl 14 preferably is fabricated from a material exhibiting the characteristics necessary for fabrication of scoop handle 12, as described hereinabove. Metallic strip 56 is attached to cutting edge 32 of head 30 of bowl 14 and continues into cavity 22 of handle 12. Strip 56 conducts heat generated from crystallization of solution 52 to cutting edge 32, thereby facilitating serving of ice cream. In further alternative embodiments, handle 12 may be formed as one piece, or handle 12 and bowl 14 may be formed as one piece. In addition, bowl 14 optionally may include non-stick coating 58. Non-stick coating 58, for example, polytetrafluoroethylene ("TEFLON"), to further reduce adherence of ice cream within bowl 14.

Figure 5:
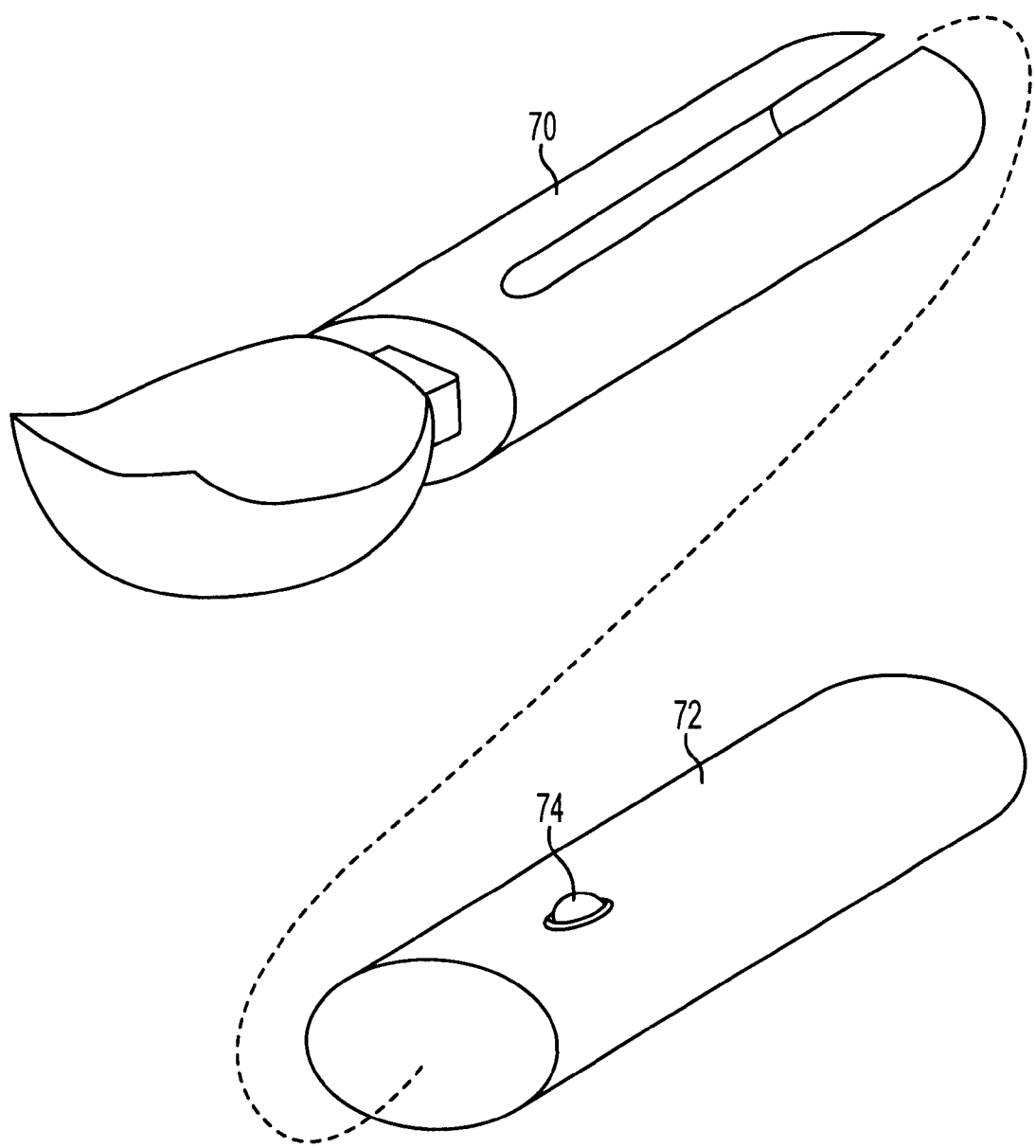
FIG. 5 is an isometric view of another alternative embodiment of the present invention with replaceable heat cartridges.

Referring now to FIG. 5, yet another alternative embodiment, constructed in accordance with the present invention and suitable for commercial applications, is described, in which cartridges containing a supersaturated salt solution may be removably inserted in the scoop handle. In applications where ice cream is served over the course of an entire business day, it is impractical to recharge the preferred embodiment described hereinabove multiple times throughout the day. Thus, scoop 70 may be used in conjunction with multiple heat cartridges 72 comprising activation mechanisms 74 that are alternated between use and recharging throughout the day. Alternatively, scoop 70 may comprise an activation mechanism, which would removably couple to heat cartridges.

While preferred illustrative embodiments of the invention are described above, it will be apparent to one skilled in the art that various changes and modifications may be made therein without departing from the invention, and the appended claims are intended to cover all such changes and modifications that fall within the true spirit and scope of the invention.

What is claimed is:

1. Apparatus for serving ice cream comprising:
   a scoop handle having an interior cavity;
   a scoop bowl comprising a cutting surface, the scoop bowl affixed to the scoop handle and in communication with the interior cavity;
   a supercoolable salt solution disposed within a cartridge adapted to be removably inserted into the interior cavity; and
   an activator operably coupled to the salt solution to initiate crystallization of the solution when the salt is supercooled,
   wherein the salt solution crystallizes at a temperature in the range of about 110–130° Fahrenheit.

2. The apparatus of claim 1 wherein the scoop handle comprises a polymer.

3. The apparatus of claim 1 wherein the scoop bowl comprises a metal.

4. The apparatus of claim 3 wherein the portion of the scoop bowl in communication with the interior cavity is coated with a material compatible with the salt solution.

5. The apparatus of claim 1 wherein the activator is sealed within the cartridge.

6. The apparatus of claim 5 further comprising a mechanism for triggering the activator from outside the cartridge.

7. The apparatus of claim 1 wherein the activator comprises a disk activator.

8. The apparatus of claim 1 further comprising a metallic strip in communication with both the cutting surface of the scoop bowl and the cavity.

9. The apparatus of claim 1, wherein the scoop bowl further comprises a non-stick coating.

10. The apparatus of claim 9, wherein the non-stick coating is fabricated from polytetrafluoroethylene.

11. The apparatus of claim 1, wherein the supercoolable salt solution comprises a supercoolable sodium acetate solution.

12. Apparatus for serving ice cream comprising:
    a scoop handle having an interior cavity;
    a scoop bowl affixed to the scoop handle and in communication with the interior cavity;
    a supercoolable sodium acetate solution disposed within a cartridge adapted to be removably inserted into the interior cavity; and
    an activator operably coupled to the sodium acetate solution.

13. The apparatus of claim 12, wherein the portion of the scoop bowl in communication with the interior cavity is coated with a material compatible with the sodium acetate solution.

14. The apparatus of claimed 12, wherein the activator is sealed within the cartridge for initiating crystallization of the solution when said solution is supercooled.

15. The apparatus of claim 14 further comprising a mechanism for triggering the activator from outside the cartridge.

16. The apparatus of claim 12, wherein the scoop bowl further comprises a non-stick coating.

17. The apparatus of claim 12, wherein the scoop bowl comprises a material chosen from a group consisting of aluminum and stainless steel.

18. The apparatus of claim 12, wherein the scoop handle comprises a material chosen from a group consisting of polyethylene, polypropylene, polyvinyl chloride, and polycarbonate.

19. Apparatus for serving ice cream comprising:
    a scoop handle having an interior cavity;
    a scoop bowl comprising a cutting surface, the scoop bowl affixed to the scoop handle and in communication with the interior cavity;
    a supercoolable salt solution disposed within a cartridge adapted to be removably inserted into the interior cavity; and
    an activator operably coupled to the salt solution to initiate crystallization of the solution when the salt is supercooled.

20. The apparatus of claim 19, wherein the salt solution crystallizes at a temperature in the range of about 110–130° Fahrenheit.

21. The apparatus of claim 19, wherein the supercoolable salt solution comprises a supercoolable sodium acetate solution.

* * * * *